T. G. REDINGTON.
SHOE TREE.
APPLICATION FILED JUNE 29, 1909.
941,947.
Patented Nov. 30, 1909.
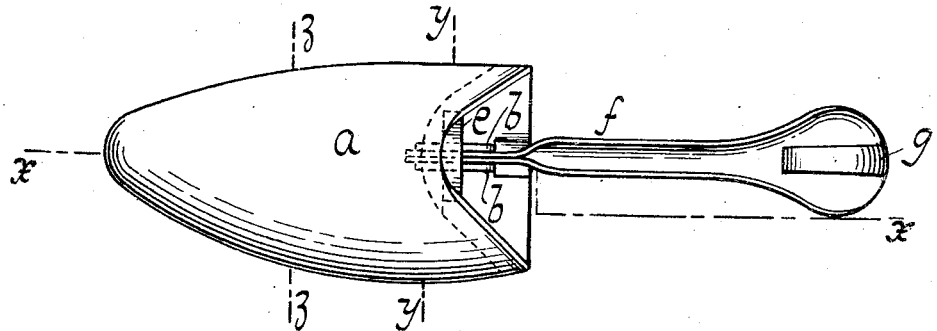
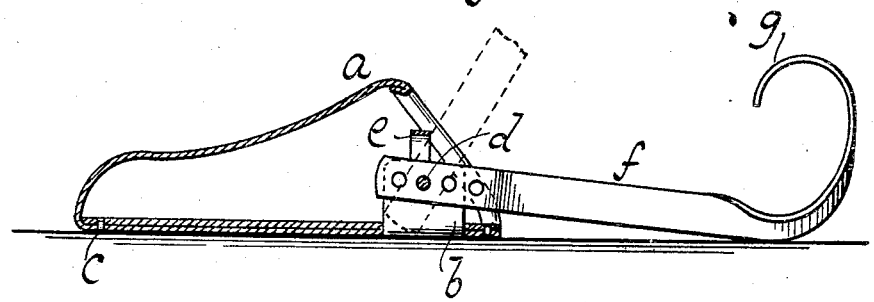
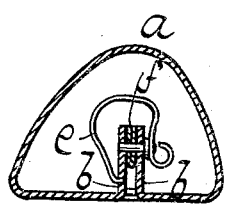
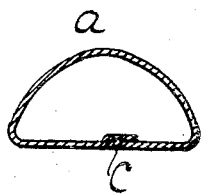
Witnesses:
William Miller
Christian Almstaedt
Inventor
Thomas G. Redington
By his Attorneys
Hauff & Warland

UNITED STATES PATENT OFFICE.

THOMAS G. REDINGTON, OF NEW YORK, N. Y.

SHOE-TREE.

941,947. Specification of Letters Patent. Patented Nov. 30, 1909.

Application filed June 29, 1909. Serial No. 504,968.

*To all whom it may concern:*

Be it known that I, THOMAS G. REDINGTON, a citizen of the United States, residing at New York, in the county of New York and State of New York, have invented new and useful Improvements in Shoe-Trees, of which the following is a specification.

This invention relates to certain improvements in shoe trees and the invention resides in novel details of construction as set forth in the following specification and claims and illustrated in the annexed drawing in which—

Figure 1 shows a plan view of a shoe tree embodying this invention. Fig. 2 is a longitudinal section along the line $x\ x$ Fig. 1. Fig. 3 is a transverse section along the line $y\ y$, Fig. 1. Fig. 4 is a section along the line $z\ z$, Fig. 1.

The shoe tree is shown at $a$. The shoe tree can be made of any suitable well known material such as sheet metal or any other substance. The rear edge of the shoe tree can be left plain or could be beaded or doubled over as seen fit. The upper part of the tree as shown has an instep shape and the lower portion is flat to a greater or less extent.

Lips or elevated portions are shown at $b$. These lips can rise to a greater or less extent as desired. Back of the lips $b$ the bottom portion of the tree can have its edges abut or overlap as desired and connected as by a rivet $c$. The lips $b$ are adapted to receive the stud or pivot $d$. This pivot is shown carried by a spring $e$. One end of the spring is shown inserted into a slit near the base of one of the lips.

The handle is shown comprising a shank portion $f$ and grasping portion $g$. The handle can be doubled to a greater or less extent and the grasping portion can be left single or not and made of any shape desired. The pivot $d$ connecting the handle $f$ to the lips or to the tree allows the handle to swing upward to be readily grasped for withdrawing the tree. If allowed to swing down the rear closed portion of the bottom of the tree prevents the handle swinging or dropping lower than desired. If the tree is inserted into a shoe the handle $f$ will of course be inserted with the tree and be held in the shoe.

The handle can have one or more holes arranged in line or otherwise. A pivot being inserted into one or another of the holes will hold the handle more or less extended as desired. By drawing the pivot out of the handle the latter can be slipped into the tree to a greater or less extent for the tree to be brought into convenient compact form for packing or shipping. The spring $e$ supports the pivot $d$ and will hold the pivot against loss so that it can be readily inserted. The bottom portion is shown with a slot which allows the handle $f$ to swing its grasping portion upward into reach for manipulating the tree. The portion of the handle forward of the pivot $d$ swinging downward would be received in such slotted portion. The pivot can be of any suitable construction such as split pin or otherwise.

I claim:

1. A shoe tree constructed of a piece of material formed into instep and foot shape and having its meeting edge bent into shape to form a flat bottom, lip portions at the bottom in advance of the rear end portion, a spring and hinge pin supported by the lip portions, and a handle pivoted between the lips and adapted to be sustained by the rear end portion, one of said lips being slitted to support one end of the spring and the lips and handle being perforated to receive the hinge pin supported by the spring.

2. A shoe tree constructed of a piece of sheet like material formed into instep and foot shape and having its meeting edge bent into shape to form a flat bottom with closed rear end portions, lip portions in advance of the rear end portion, and a handle pivoted between the lips and adapted to be sustained by the rear end portion, said bottom portion having an opening in advance of the rear portion to allow the forwardly projecting portion of the handle to enter for the handle to swing up into grasping position to manipulate the tree.

In testimony whereof I have hereunto set my hand in the presence of two subscribing witnesses.

THOMAS G. REDINGTON.

Witnesses:
CHRISTIAN ALMSTAEDT,
W. C. HAUFF.